UNITED STATES PATENT OFFICE.

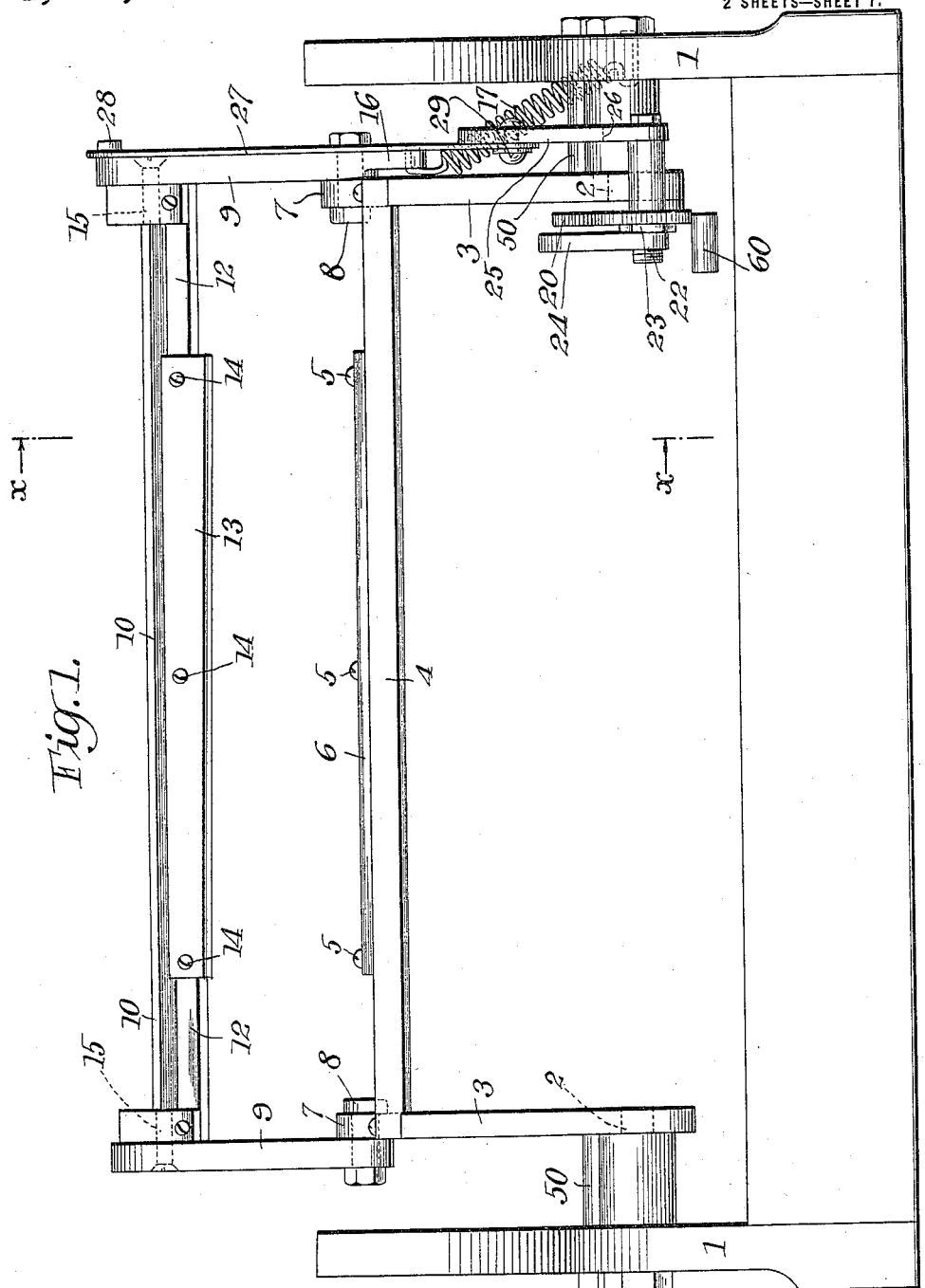

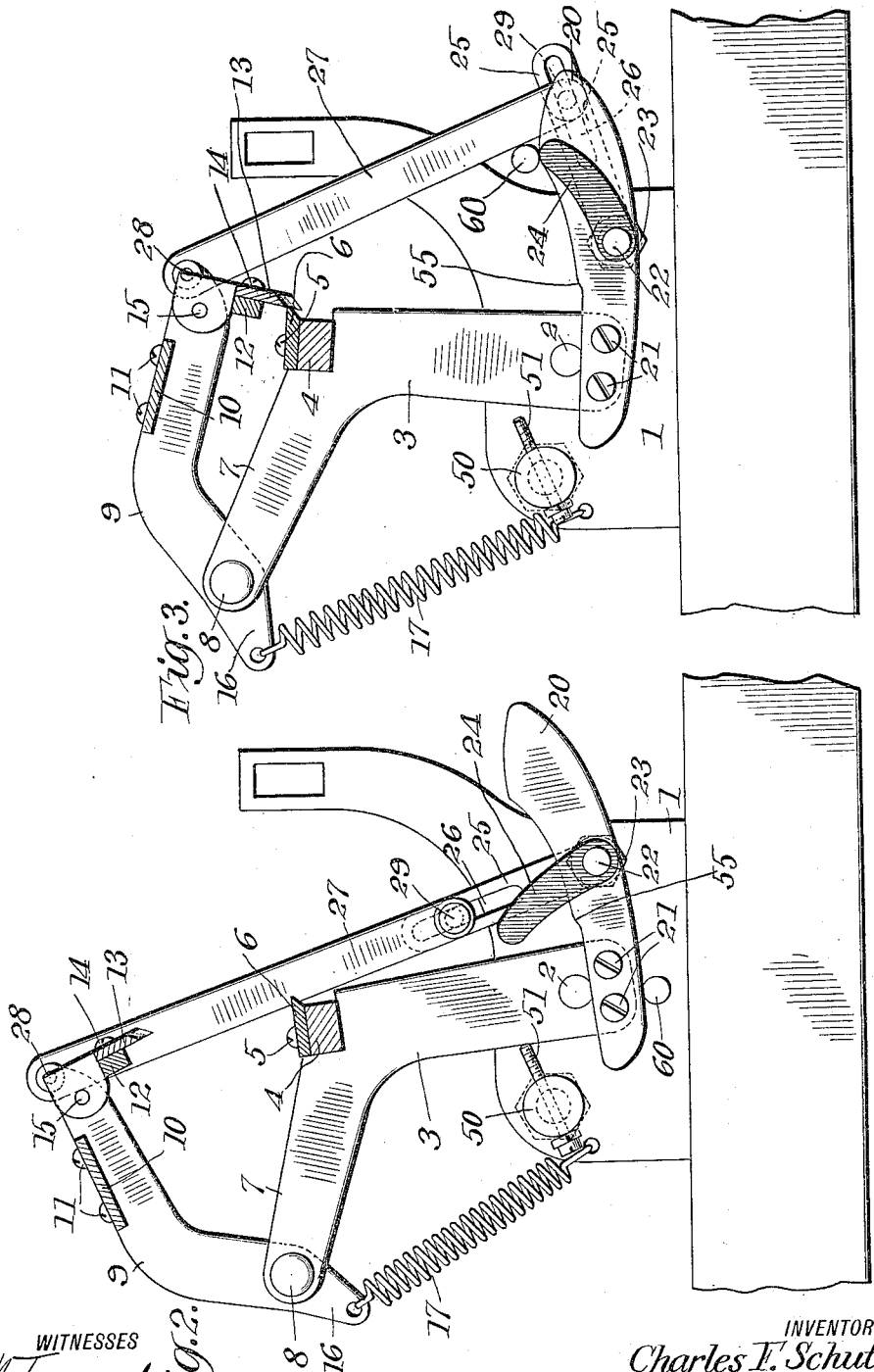

CHARLES F. SCHUTTE, OF UTICA, NEW YORK.

PAPER-CUTTING MECHANISM.

1,145,039. Specification of Letters Patent. Patented July 6, 1915.

Application filed October 30, 1914. Serial No. 869,364.

*To all whom it may concern:*

Be it known that I, CHARLES F. SCHUTTE, a citizen of the United States, and a resident of Utica, in the county of Oneida and State of New York, have invented certain new and useful Improvements in Paper-Cutting Mechanism, of which the following is a specification.

My invention relates to cutting mechanisms and more particularly to a paper cutting mechanism adapted for use in box-topping machines or that class of machine designed to automatically attach the finishing surfaces to cardboard boxes.

My invention is adapted primarily for use in a machine similar to that described and illustrated in United States patent granted to John F. O'Brien and George F. Bowdle No. 1,106,727 and dated August 11th 1914, although in its application it is not limited to that class of machine.

The main objects of my invention are the production of a cutting mechanism of positive operation, of few parts, of simplicity and of low cost to manufacture.

Further objects of the invention are the production of a cutting mechanism provided with improved means whereby the normal space between the cutting blades is adjustable and also provided with means whereby the "throw" of the upper blade is adjustable without changing the normal space between the cutting blades.

A further object of the invention is the production of a cutting mechanism which shall be provided with means for adjusting the normal position of the entire mechanism.

Further objects and advantages of the invention will appear in the following description, the invention consisting in the novel features and parts and combinations of parts hereinafter more particularly described and then specified in the claims.

In the accompanying drawings: Figure 1 is a front elevation of my preferred form of cutting mechanism and for convenience and briefness of description I shall consider it as applied to the box-topping machine described and illustrated in the patent above referred to and to supersede the cutting mechanism shown and described in that patent. Fig. 2 is a vertical section taken on the line *x—x* of Fig. 1. Fig. 3 is a view similar to Fig. 2 showing the cutting mechanism in cutting position.

In the drawings: 1 indicates side plates of a box-topping machine corresponding to the side plates 24 of the patent above referred to and to which a paper-cutting frame is pivoted at 2. The paper-cutting frame consists of side members 3 connected by a cross-member 4 to which is fastened, by the screws 5, or by any other desirable means, the lower cutting blade 6. The side members 3 are provided with extensions 7 to which a sub-frame is pivoted at 8, the sub-frame consisting of side members 9 and a cross-member 10 attached to the side members 9 by the screws 11 or in any other desirable manner. A bar 12 carries the upper cutting blade 13 which is fastened to the bar preferably by the screws 14 and the bar is loosely mounted on the pivots 15 which are secured to the side members 9.

One of the side members 9 is provided with an extension 16, a spring 17 being fastened to the extension and to one of the side plates 1. The function of the spring 17 is to return the cutting mechanism to its normal position (shown in Fig. 2) after it has swung forward on pivots 2 for the cutting stroke, that is, after it has taken the position shown in Fig. 3. The pivot bearings shown at 50 might also be used to carry a paper-controlling frame such as indicated at 26 in the aforementioned patent but which forms no part of my invention and in consequence will not be described or shown herein. One of the pivot bearings 50 is provided with a screw hole and a screw 51 carrying a lock nut, the screw 51 engaging one of the side members 3 when the cutting mechanism is in normal position to prevent the cutting mechanism swinging out of its normal position in a counter-clockwise motion due to the action of the spring 17.

It is obvious that by means of the screw 51 with its lock nut the normal position of the cutting mechanism may be adjusted where it is so desired.

A cam 20 adapted to actuate the lower cutting blade 6 is securely fastened, as by the screws 21, to one of the side members 3. A short shaft 22 is journaled in cam 20, one end of the shaft 22 being threaded and on which is first screwed a lock nut 23 and then the small cam 24 which is adapted to actuate the upper cutting blade 13. The purpose of threading the end of the shaft 22 as described and using the nut is for adjusting the normal position of the cam 24. Obviously, the small cam may be screwed on the shaft 22 and moved either forward or backward until its desired normal position has been obtained, and then the nut 23 may be tightened up against it to retain the cam in any desired position. A bar 25 is rigidly fastened to the opposite end of the shaft 22 and it is provided with a slot 26. A connecting rod 27 is pivoted to one of the side members 9 at 28 and is connected to the bar 25 by means of the bearing screw 29 which is passed through the slot 26 and is then tightened so that the bearing screw will not slide in the slot when the cutting mechanism is operated but will act as a pivot connection for the bar 25 and one of the side members 9.

A roller 60 is operated and carried by any convenient means (not shown) as for instance the means employed in the O'Brien and Bowdle patent to actuate the roller 74 therein, the roller 60 in this case corresponding to the roller 74 of the said patent. Said roller 60 is shown in Fig. 2 in the position of passing under cam 20 during the forward movement of the form 6 shown in said patent. On its return movement the roller engages at first the shoulder 55 on the upper surface of cam 20 forcing the same downward and thereby swinging the entire cutting mechanism forward on the pivots 2 and against the action of the spring 17. As the roller continues forward on its movement it continually forces cam 20 downward and then engages cam 24 rocking the latter cam from its normal vertical position to a horizontal position and thereby drawing the upper cutting blade 13 downward across the face of the lower cutting blade 6, this movement being termed the "throw" of the cutting blade. When the roller 60 has traveled forward a definite distance and has arrived at the point at which it no longer engages the upper surfaces of the cams 20 and 24, and the cutting stroke has been completed, the cutting mechanism swings back on its pivots 2 by means of spring 17 and assumes its normal position. Thus it will be seen that in my cutting mechanism the cutting blades are brought together by positively acting means and the cutting mechanism is entirely controlled by roller 60.

It is obvious that my cutting mechanism is particularly efficacious for the reason that the normal position of the mechanism may be adjusted by means of the screw 51 with its lock nut, also the "throw" of the upper cutting blade 13 is adjustable by changing the normal position of small cam 24 by the means which have been previously described. For instance, if the upper blade 13 does not throw down far enough to cut the full width of the blade, small cam 24 may be moved toward the side member 3 so that it will more quickly become engaged by roller 60 and the "throw" of the upper cutting blade is adjustable by the means described, as is obvious, without changing the normal space between the cutting blades. The making of the throwing blade adjustable is also desirable as it obviates the necessity of furnishing new blades whenever the old ones become worn or dull.

Another advantage of my cutting mechanism is the adjustability of the normal space between the cutting blades by means of the bearing screw 29 and the slot 26. The operating length of the connecting rod 27 may then be regulated, that is it may be made greater or less than its normal length as desired, and the normal space between the cutting blades is proportionately made greater or less.

It is to be understood that my improved cutting mechanism is not limited to the exact details of construction and arrangement of parts herein shown and described, such being for the purpose of illustration only, but various modifications may be resorted to without departing from the spirit of my invention as set forth in the appended claims.

What I claim as my invention is:—

1. In an apparatus of the character described, a frame, a cutting member mounted on said frame, a sub-frame mounted on said frame, a second cutting member mounted on said sub-frame, means for adjusting the throw of said second cutting member without changing the normal position of said cutting members or the normal space between said cutting members and means for actuating said frame and said sub-frame to move both of said cutting members toward each other and bring said cutting members together.

2. In an apparatus of the character described, a frame, a cutting member mounted on said frame, a sub-frame mounted on said frame, a second cutting member mounted on said sub-frame, means for adjusting the throw of said second cutting member without changing the normal position of said cutting members or the normal space between said cutting members, means for adjusting the normal space between said cutting members and means for actuating said frame and said sub-frame to move both of said cutting members toward each other and bring said cutting members together.

3. In an apparatus of the character described, a movable frame, a cutting member mounted on said movable frame, a movable sub-frame mounted on said movable frame, a second cutting member mounted on said movable sub-frame, means for adjusting the throw of said second cutting member without changing the normal position of said cutting members or the normal space between said cutting members, means for adjusting the normal position of said movable frame and means for actuating said movable frame and said movable sub-frame to move both of said cutting members toward each other and bring said cutting members together.

4. In an apparatus of the character described, a movable frame, a cutting member carried by said movable frame, a movable sub-frame mounted on said movable frame, a cutting member carried by said movable sub-frame, means for actuating said movable frame, means mounted on said first-named means for actuating said movable sub-frame, said cutting members being adapted to be moved toward each other and brought together when said movable frame and movable sub-frame are actuated.

5. In an apparatus of the character described, a movable frame, a cutting member mounted on said movable frame, a sub-frame mounted on said movable frame, a cutting member mounted on said sub-frame, a cam for actuating said movable frame and a second cam carried by said first-named cam for actuating said sub-frame.

6. In a paper cutting mechanism, a lower cutting blade mounted on a movable frame, an upper cutting blade mounted on a sub-frame, a cam for actuating said lower cutting blade, a cam mounted on said first-named cam for actuating said upper cutting blade, and means for adjusting the normal position of said second-named cam to regulate the throw of said upper cutting blade.

7. In a paper cutting mechanism, a lower cutting blade mounted on a movable frame, an upper cutting blade mounted on a sub-frame, a cam for actuating said lower cutting blade, a cam mounted on said first-named cam for actuating said upper cutting blade, means for regulating the normal space between said cutting blades and means for adjusting the normal position of said second-named cam to regulate the throw of said upper cutting blade.

8. In a paper cutting mechanism, a movable frame, a lower cutting blade mounted on said movable frame, a sub-frame mounted on said movable frame, an upper cutting blade mounted on said sub-frame, a cam fastened to said movable frame for actuating said movable frame, a shaft journaled in said cam, a small cam mounted on said shaft for actuating said sub-frame, a bar fastened to said shaft and a connecting rod pivoted to said sub-frame and connected with said bar.

9. In a paper cutting mechanism, a movable frame, a lower cutting blade mounted on said movable frame, a sub-frame mounted on said movable frame, an upper cutting blade mounted on said sub-frame, a cam carried by said movable frame and adapted to actuate the same, a small cam mounted on said first-named cam and adapted to actuate said sub-frame, means for adjusting the normal position of the cutting mechanism, means for adjusting the normal space between said cutting blades and means for adjusting the normal position of said small cam so as to regulate the throw of said upper cutting blade.

10. In a paper cutting mechanism for a box-topping machine, a movable frame, a lower cutting blade mounted on said movable frame, a sub-frame mounted on said movable frame, an upper cutting blade mounted on said sub-frame, a cam carried by said movable frame and adapted to actuate said movable frame, a shaft journaled in said cam, a small cam mounted on said shaft and adapted to actuate said sub-frame, a bar fastened to said shaft, a connecting rod pivoted to said sub-frame and connected with said bar, means for adjusting the normal position of said small cam so as to regulate the throw of said upper cutting blade, means for adjusting the operating length of said connecting rod to regulate the normal space between said cutting blades, means for returning to and retaining in normal position the cutting mechanism and means for regulating the normal position of the cutting mechanism.

11. In a paper cutting mechanism, a lower cutting member mounted on a movable frame, an upper cutting member mounted on a movable sub-frame, means for actuating each of said cutting members and means connecting said movable sub-frame and said means for actuating said cutting members and adapted to be adjusted to regulate the normal space between said cutting members.

12. In a paper cutting mechanism, a lower cutting blade mounted on a frame, an upper cutting blade mounted on a sub-frame, means for adjusting the throw of the upper cutting blade without changing the normal space between the cutting blades, means for actuating each of said cutting blades and means connecting said sub-frame and said means for actuating said cutting blades and adapted to be adjusted to regulate the normal space between said cutting blades.

Signed at Utica, in the county of Oneida and State of New York, this 26 day of Oct., A. D. 1914.

CHARLES F. SCHUTTE.

Witnesses:
 FRED. D. HAMILTON,
 BENJ. J. THOMAS.